March 6, 1951     S. S. BROWN     2,543,828
DEVICE FOR CONTROLLING THE INJECTION OF FLUIDS
Filed March 30, 1949
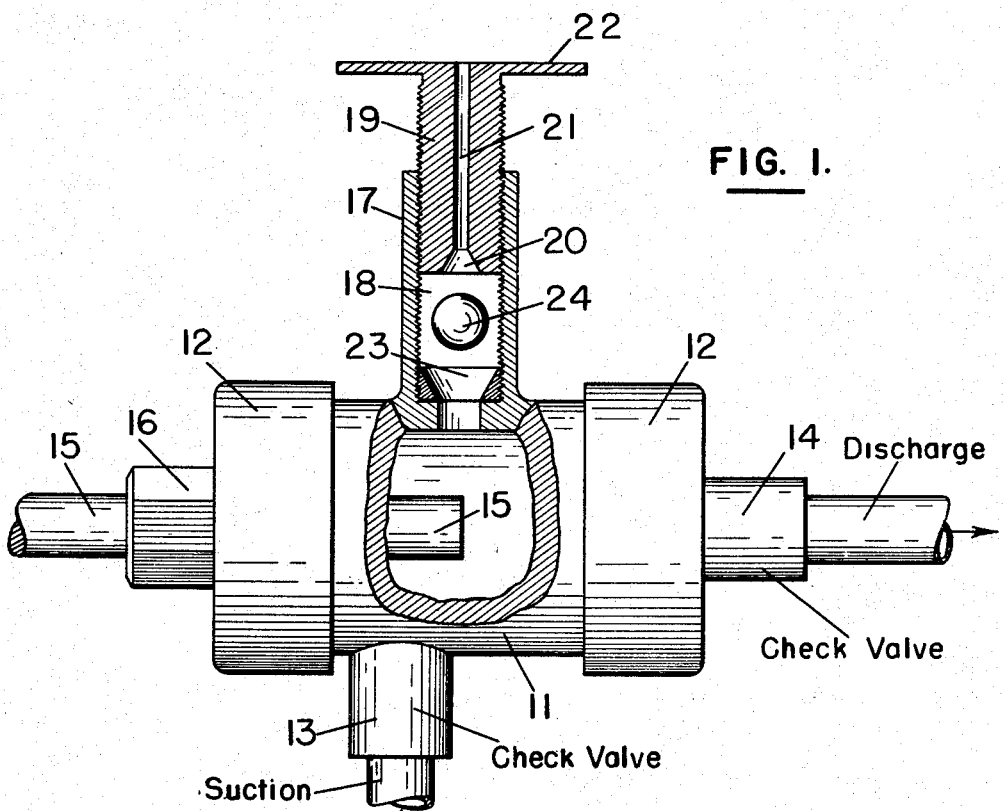
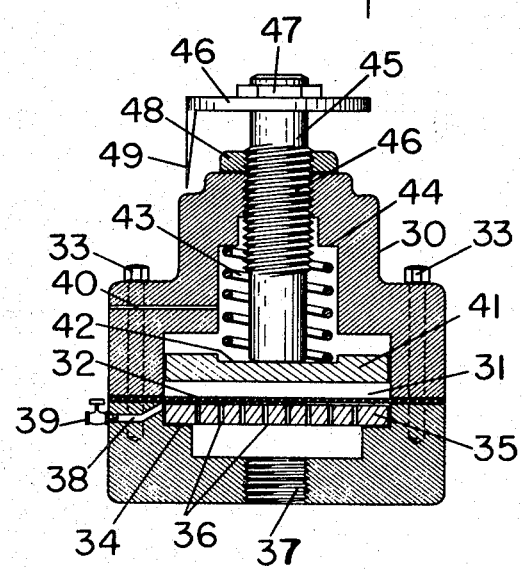
Stephen S. Brown
INVENTOR Patented Mar. 6, 1951

2,543,828

UNITED STATES PATENT OFFICE 2,543,828

DEVICE FOR CONTROLLING THE INJECTION OF FLUIDS

Stephen S. Brown, Houston, Tex., assignor, by mesne assignments, to Standard Oil Development Company, Elizabeth, N. J., a corporation of Delaware Application March 30, 1949, Serial No. 84,387

8 Claims. (Cl. 103—37)

The present invention is directed to a device for controlling the rate of flow of one fluid into another. More particularly, the invention is directed to a device for varying the rate of flow of one fluid into a system or conduit adapted to receive the fluid.

In many industrial operations wherein chemicals are employed, it is necessary to inject the chemicals into a closed system at a controlled rate of flow. For example, in oil well drilling operations, it is frequently desirable to pump certain chemicals into conduits to condition drilling fluids, and to control corrosion in well conduits and the like. The amount of chemicals employed may be very small compared to the amount of drilling fluid employed in the drilling operation.

In other operations, such as chemical refining of petroleum, catalytic conversion operations, such as isomerization, and the like, it is frequently necessary to inject small and controlled quantities of chemicals into the system wherein they are used.

The injection of such small quantities of chemicals has been performed in the past by employing chemical injectors which are miniature pumps; the amount of chemicals being pumped is varied by controlling the strike of the piston through mechanical linkages. Such devices have been largely unsatisfactory due to lost motion in the mechanical linkages which make for inaccurate measurements and also delayed injection of chemicals. Proper and close adjustment of chemical injectors constitutes a problem of long standing in the industry.

It is, therefore, the main object of the present invention to provide an improved device wherein controlled and varied amounts of fluids may be injected into a system.

Another object of the present invention is to provide an improved device wherein the mechanical linkages in an injector are eliminated.

The present invention may be described briefly as embodying a cylinder adapted to receive a movable piston. The cylinder is connected by suitable valves and conduits to a source of a fluid to be injected and to the system into which the fluid is to be injected. Mounted on and in fluid communication with the cylinder containing the piston is a chamber which may be disposed on the cylinder in a vertical or horizontal position or any other position depending on the type of movable member employed as will be described. The chamber comprises an adjusting means which allows the volume of the chamber to be varied at will. A passageway in the chamber allows venting of any air which may be trapped therein. The chamber is also provided with a movable member which may be a diaphragm or a sphere having a specific gravity sufficient to float in the liquid being injected, the diaphragm or sphere being adapted to assume first and second positions such that when the liquid is being pumped, the diaphragm or sphere is in the second position and when liquid is being drawn into the cylinder, the diaphragm or sphere is in a first position, the rise of the diaphragm or sphere being adjusted by an adjustable plug which varies the volume of the cylinder and, therefore, limits the rise of the diaphragm or sphere as the case may be.

The invention will be better understood and the objects thereof illustrated by reference to the drawing in which Figure 1 is a front elevation in partial section of a device employing a sphere as the movable member, and Figure 2 is a preferred form of the present invention wherein a diaphragm is employed as the movable member.

Referring now to the drawing and specifically to Fig. 1, numeral 11 designates a cylinder which is provided with closure members 12. Cylinder 11 is provided with an inlet 13 including a conventional check valve and an outlet 14, also including a conventional check valve. Inlet 13 connects to a suitable source of liquid to be pumped, not shown, and outlet 14 connects to the system into which the liquid is to be injected. A piston member 15 is arranged to move inwardly to and outwardly from cylinder 11 through a stuffing box 16, piston 15 being connected to a source of power, not shown, to cause longitudinal movement of the piston 15.

Arranged in a vertical position on cylinder 11 is a body member 17 defining a chamber 18. Body 17 is provided with internal threads designed to cooperate with the external threads of an adjusting plug 19 which is threadably engaged therewith. Adjusting plug 19 provides an adjusting means and defines a movable seat 20 and a passageway 21 which provides fluid communication between chamber 18 and the atmosphere. A suitable wheel 22 is made an integral part of plug 19 to allow the raising and lowering thereof. The lower portion of body member 17 is in the form of a movable seat 23 which is threadably engaged with the internal threads of body member 17. Arranged in chamber 18 is a spherical member 24 which is constructed of suitable material such that it has a specific gravity which will allow it to float freely in liquid which is drawn into the chamber 18.

Thus, it can be seen that the device consists of a chamber mounted on the fluid cylinder of a pump or injector as it may be termed. The chamber contains an adjusting plug defining a passageway to the atmosphere. The adjusting plug defines a seat and the bottom of the chamber connecting with the cylinder also defines a seat. Both seats are adapted to receive the spherical member which may be seated either against the top seat or the bottom seat as will be seen from the description of the operation of the device.

Assume that a suitable liquid is to be drawn into the apparatus of the present invention through inlet 13 and injected into a system through outlet 14, it will be seen that on the discharge stroke of the piston 15 liquid will rise in the chamber 18 carrying with it the spherical member 24 before any fluid can overcome the resistance of the check valve in conduit 14. As the liquid rises in the chamber 18 carrying the spherical member 24 upwardly, any air in the chamber 18 is forced out through passageway 21. Upon reaching the seat 20 the spherical member 24 seats therein allowing pressure to be built up in cylinder 11 which causes the discharge check valve in outlet 14 to open allowing liquid to be injected or pumped into the system connected to outlet 14. On the suction stroke, as the piston 15 is withdrawn from the cylinder 11, the liquid in chamber 18 drains into the cylinder 11 until the spherical member 24 has seated on seat 23 thus sealing the chamber 18 from the cylinder 11. Continuation of the suction stroke of piston 15 pulls the check valve in inlet line 13 open allowing liquid from the source of liquid connected to inlet 13 to enter cylinder 11. Thus, by manipulating wheel 22 adjusting plug 19 may be lowered to the bottom of the chamber 18 and fluid can be kept out of this chamber entirely thus injecting into the system connected to outlet 14 an amount of fluid equal to the full displacement of the piston 15 on the discharge stroke. By moving the plug 19 upwardly, an increased volume can be received in the chamber 18 thus reducing the amount injected into the system connected to outlet 14 by the volume available in chamber 18. The plug may be raised to a point where the volume of chamber 18 is equal to or greater than the full displacement of piston 15, resulting in the pumping of no fluid at all on the discharge stroke of piston 15. Thus, it may be seen that the device gives a variable control of the amount injected between the limits of zero and full piston displacement.

Referring now to Fig. 2, a preferred embodiment of my device will be described in which a diaphragm is substituted for the spherical member 24. The device of Fig. 2 is adapted to be arranged on a cylinder 11 as shown in Fig. 1, and, therefore, the description of the cylinder 11 and its appurtenances including piston 15 need not be repeated here. The device of Fig. 2 includes a body member 30 defining a chamber 31 in which is arranged a diaphragm 32 which is seated in a flange by constructing body member 30 in two parts, the two parts of body member 30 defining the chamber 31 and being held together by threaded bolts 33, the bolts 33 being engaged with recesses in body member 30. The body member 30 may be arranged vertically, horizontally or in any other position on cylinder 11. In this instance, it is preferred to arrange member 30 in a horizontal position. Arranged below the diaphragm 32 and resting on an internal shoulder 24 of body 30 is a seating disc 35 which defines a plurality of passageways 36 allowing fluid communication between the diaphragm and cylinder 11 through port 37 defined by body member 30. Port 37 is internally threaded and may be screwed into a nipple (not shown) which may be welded on cylinder 11. Body member 30 defines a passageway 38 communicating the portion of chamber 31 below diaphragm 32 with the atmosphere. Passageway 38 is provided with a valve 39 to allow bleeding of any air which may be trapped below diaphragm 32 and seating disc 35. In the upper portion of body member 30 is a second passageway 40 which allows venting to the atmosphere of any air which may be trapped above diaphragm 32.

Arranged above diaphragm 32 is a spring loaded returning disc 41 which is provided with a recessed space 42 into which bears a spring or tension means 43. The upper end of spring or tension means 43 bears against an internal shoulder 44 defined by the upper portion of body member 30. Bearing against the spring loaded returning disc 41 is a controllable stop screw 45 which is provided with external threads 46 which cooperate with internal threads defined by the upper portion of body member 30. The controllable stop screw 45 is provided with a control wheel 46 which is arranged thereon by a nut 47. A lock nut 48 forms a closure through which the stop screw may be manipulated. Control wheel 46 is provided with a calibration pointer 49 which may be calibrated in terms of the amount of liquid to be injected by the device as will be described further.

It will be seen from the foregoing description of Fig. 2 that the preferred embodiment consists of a chamber defined by body member 30 mounted the fluid cylinder 11 of a suitable pump or injector. This chamber contains a diaphragm 32, a stop screw 45, a spring loaded returning disc 41, and a diaphragm seating disc 35. The device of Fig. 2 is to be preferred over the device of Fig. 1 since the possible difficulties of obtaining complete sealing of liquid by the spherical member 24 are eliminated in this embodiment of my invention.

The operation of this embodiment of my invention may be described as follows: On the discharge stroke of the piston 15 liquid rises under the diaphragm forcing the diaphragm upward until the returning disc 41 on top of the diaphragm seats against the controllable stop screw 45. Since no more volume for expansion is available under the diaphragm after the disc 41 is seated on the screw 45, the remainder of the liquid displaced by the incoming piston 15 will be injected or pumped out of the cylinder 11 through outlet 14 because the rise in pressure will force the check valve in outlet 14 open. On the suction stroke as the piston 15 is withdrawn from cylinder 11, fluid under the diaphragm drains into the cylinder 11 and the diaphragm is forced downward by the action of spring 43 on the spring loaded returning disc 41. This action continues until all of the liquid beneath the diaphragm has entered the cylinder 11 and the diaphragm has been seated on seating disc 35. Continued withdrawl of the piston 15 from the cylinder 11 opens the valve in inlet 13 and a volume of liquid is drawn into the cylinder equivalent to the remaining displacement of the piston. By withdrawing the controllable stop screw 45, the volume beneath the diaphragm at its full extension may be increased; by extending the controllable stop screw 45, the volume may be decreased. Since the pump injects out of the cylinder 11 an amount of fluid equal in volume to the difference between the full piston displacement and the volume beneath the diaphragm 32, a direct control of the amount of liquid pumped can be obtained infinitely variable between the limits of zero and full piston displacement.

The operation of the present device will be further illustrated by the following example in which a device similar to the embodiment of Fig. 2 was placed on a chemical pump having a ¼ inch piston with a 2 inch stroke. With a pump speed set at 40 strokes per minute, it has been possible to vary the pumping rate from 0 to approximately 18 gallons per day. It has also been possible to pump liquid with an accuracy of less than 1 pint per day.

By providing a scale on the calibration pointer 49, it may be possible to set the controllable stop screw 45 to pump at any rate by simple manipulation of control wheel 46.

The spherical member 24 of the device of Figure 1 should be suitably constructed of construction materials that will allow the spherical member 24 to float in the liquids being pumped. For example when pumping aqueous solutions, organic solutions, liquids containing corrosion inhibitors, and the like, the spherical member may be constructed of wood, resins, polymers such as tetrafluro ethylene, and the like.

In the device of Fig. 2, it will be desirable to construct the diaphragm 32 of materials which will allow it to flex and to contract with the movement of the piston 15. Construction materials of synthetic rubber, such as a butadiene-styrene polymer, stainless steel in thin sheets, impregnated canvas, rubbery materials, and the like may be employed when pumping chemicals such as aqueous solutions, organic liquids such as aromatic solutions of wetting agents, soaps, and solutions containing corrosion inhibitors, and the like.

The device of the present invention may be applied to any type of reciprocating chemical injection device by modifying the injection device by providing a chamber disposed on each of the cylinders of the reciprocating device to control the amount of fluid injected from each cylinder. Thus, a chemical injection device of the duplex or triplex type may be modified in accordance with the present invention by providing a plurality of chambers with one arranged on each of the cylinders thereof.

As mentioned before the chamber mounted on the cylinder may be arranged thereon in a vertical, horizontal or any other position allowing free access of liquid thereto and allowing free drainage of liquid therefrom. When the movable member is a sphere, it will be necessary to mount the chamber vertically to the cylinder whereas when the movable member is a diaphragm it may be desirable to arrange it in a horizontal position on the cylinder.

The nature and objects of the present invention having been completely described and illustrated what I wish to claim as new and useful and to secure by Letters Patent is:

1. A device for injecting liquids at a controllable rate into a system which comprises, in combination, a cylinder, a piston arranged in and movable in said cylinder, an inlet line to and an outlet line from said cylinder, said inlet and outlet lines comprising check valves permitting flow into and outwardly from said cylinder, a body member defining a chamber mounted on and in fluid communications with said cylinder, adjusting means arranged in said body defining a first seating member and adapted to vary the volume of said chamber, a passageway defined by said body member adapted for fluidly communicating said chamber with the atmosphere, a movable valve member in said chamber adapted to assume a first and second position and to be received by said first seating member when in the second position, a second seating member arranged in said chamber below said movable member and adapted to receive said movable member when in the first position, the second position of said movable member being determined by the position of the adjusting means and the first position of said movable member being determined by the position of said second seating member.

2. A device for injecting liquids at a controllable rate into a system which comprises, in combination, an assembly including a cylinder, a body member defining a chamber mounted on and in fluid communication with said cylinder and an adjusting means arranged in said body defining a first seating member and adapted to vary the volume of said cylinder; a piston arranged in and movable in said cylinder; an inlet line to and an outlet line from said cylinder, said inlet and outlet lines comprising check valves permitting flow into and outwardly from said cylinder; a passageway defined by said assembly adapted for fluidly communicating said chamber with the atmosphere; a movable valve member in said chamber adapted to assume a first and second position and to be received by said first seating member when in the second position; a second seating member arranged in said chamber adapted to receive said movable member when in the second position, the second position of said movable member being determined by the position of the adjusting means and the first position of said movable member being determined by the position of said second seating member.

3. A device in accordance with claim 2 in which the movable member is a diaphragm.

4. A device in accordance with claim 2 in which the movable member is a sphere having a specific gravity sufficient to float in the liquid being injected.

5. A device for injecting liquids at a controllable rate into a system which comprises, in combination, a cylinder, a piston arranged in and movable in said cylinder, an inlet line to and an outlet line from said cylinder, said inlet and outlet lines comprising check valves permitting liquid flow into and outwardly from said cylinder, a body member defining a chamber mounted on and in fluid communication with said cylinder, a disc member arranged in said body and adapted to vary the volume of said chamber, tension means bearing against said disc member and against an internal shoulder defined by said body member, a stop screw adapted for raising and lowering said disc member, a passageway defined by said body member adapted for fluidly communicating said chamber with the atmosphere, a diaphragm arranged in said chamber below said disc member and adapted to assume a first and second position, a seating disc arranged in said chamber below said diaphragm and adapted to receive said diaphragm, the second position of said diaphragm being determined by the position of said disc member and the first position of said diaphragm being determined by the position of said seating disc.

6. A device in accordance with claim 5 in which the seating disc defines a plurality of passageways fluidly communicating said diaphragm with said cylinder.

7. A device for injecting liquids at a controllable rate into a system which comprises, in combination, a cylinder, a piston arranged in and movable in said cylinder, an inlet line to and outlet line from said cylinder, said inlet and outlet lines comprising check valves permitting liquid flow to and outwardly from said cylinder, a body member defining a chamber mounted on and in fluid communication with said cylinder, an adjusting means defining a first seating member arranged in said body and adapted to vary the volume of said chamber and to receive a spherical member, a passageway defined by said adjusting means adapted for fluidly communicating said chamber with the atmosphere, a spherical member in said chamber adapted to assume a first and second position and to be received by said first seating member when in the second position, a second seating member arranged in said chamber below said spherical member and adapted to receive said spherical member when in the first position, the second position of said movable member being determined by the position of the first seating member defined by the adjusting means and the first position of said movable member being determined by the second seating member arranged below said spherical member.

8. A device in accordance with claim 7 in which the adjusting member defines an externally threaded adjusting plug which cooperates with internal threads on said body member.

STEPHEN S. BROWN.

REFERENCES CITED

The following references are of record in the file of this patent:

UNITED STATES PATENTS

| Number | Name | Date |
|---|---|---|
| 957,451 | Willet | May 10, 1910 |
| 1,325,102 | Matthews | Dec. 16, 1919 |
| 2,038,311 | Parsons | Apr. 21, 1936 |